United States Patent [19]
Kulzer

[11] 3,782,847
[45] Jan. 1, 1974

[54] METHOD AND APPARATUS FOR RECONDITIONING CYLINDER HEADS

[76] Inventor: Leonard J. Kulzer, 1909 W. 5th St., Winona, Minn. 55987

[22] Filed: Dec. 29, 1971

[21] Appl. No.: 213,445

[52] U.S. Cl. ............... 408/1, 408/75, 408/709, 408/89, 408/91
[51] Int. Cl. ............................................. B23b 35/00
[58] Field of Search ............... 408/1, 91, 75, 80, 408/81, 82, 708, 709, 89

[56] References Cited
UNITED STATES PATENTS
| | | | |
|---|---|---|---|
| 3,333,487 | 8/1967 | Parry | 408/80 |
| 2,834,233 | 5/1958 | Anderson | 408/708 X |

*Primary Examiner*—Gil Weidenfeld
*Attorney*—Whiteley & Caine

[57] ABSTRACT

Apparatus for supporting a cylinder head, for reconditioning of the valve guides and seats, in a simple machine of the drill press type, without requiring complex means for positioning the reconditioning cutters and reamers at many different angles, including a first structure supporting a cylinder head for rotation about two mutually orthogonal axes to bring openings to be reconditioned into proper axial alignment with a reconditioning tool, and a second structure forming a support for the first structure and enabling translation of the latter with respect to the bed of the machine, as well as a novel method of reconditioning cylinder heads made possible by use of the apparatus.

6 Claims, 10 Drawing Figures

FIG. 1.

INVENTOR.
Leonard J. Kulzer
BY
Whiteley and Caine
ATTORNEYS

INVENTOR.
Leonard J. Kulzer
BY
Whiteley and Caine
ATTORNEYS

INVENTOR.
Leonard J. Kulzer
BY Whiteley and Caine
ATTORNEYS

METHOD AND APPARATUS FOR RECONDITIONING CYLINDER HEADS

This invention relates to the field of machine shop equipment and practice, and more particularly comprises a method for reconditioning the valve seats and guides of internal combustion engines, and an apparatus for practicing the method. For the most part, valve guides and seats are located in the cylinder heads of the engines, and the invention will be so described: such heads are characterized by having a plane surface for engagement with a matching plane surface of a cylinder block, a sealing gasket normally being interposed and clamped therebetween by tightening nuts on studs projecting from the block and passing through appropriately placed holes in the head.

A cylinder head is an intricate hollow casting, cored not only to provide passages for the flow of cooling liquid, but also to provide passages for the influx of combustible gas to, and for the efflux of the gaseous products of combustion from, the engine cylinders, mating surfaces being provided for connection with intake and exhaust manifolds for this purpose. Associated with each cylinder there must be an intake valve and an exhaust valve. A typical valve includes an elongated cylindrical stem reciprocable in a valve guide or cylindrical passage in the cylinder head, and an enlarged flat end portion having a beveled face which sealingly engages a reverse-beveled seat in the cylinder head. The seats are thus coaxial with the guides. The valves are normally maintained closed by the action of stiff springs, and are actuated by lobes on a common cam shaft which may be located in the cylinder block and act on the valves through push rods and rocker arms.

In normal engine use valves, seats and guides are subject to wear. Valves can economically be discarded and replaced, but it has been found practical to recondition the heads themselves by resizing the holes and inserting replacement valve guide sleeves. The valve seats may be reground or enlarged to receive replacement seats.

A common characteristic of the valve arrangements in all currently significant cylinder heads is that they are generally in a row or rows longitudinally of the casting. The mating surface of the head with the exhaust manifold may be used as an index of the direction of the row of valves. In early engines, the axes of the valve stems and seats were perpendicular to the plane mating surface of the head, and hence were parallel, but it soon became desirable to have these axes at some angle or angles other than 90°. There may now be defined two general types of valve arrangements. If the axes of all the valves, although not themselves perpendicular to the plane surface of the head, yet lie in planes perpendicular to that surface and to the longitudinal axis of the head, they may be referred to as "single angle" arrangements. "Compound angle" arrangements are those in which the axes of the valves have components of slant along the longitudinal axis of the head as well as transverse thereto. It is conventional that all exhaust valves have the same axis angle with respect to the plane surface, and that all intake valves also have the same angle, which is usually different from that of the exhaust valves.

In such circumstances the valves are usually in two rows, both parallel to the longitudinal axis of the head, but somewhat displaced from one another. Where compound angle arrangements are used, it is customary to define the direction of each valve axis by an initial angle, in a plane normal to the longitudinal axis of the head and to the plane mating surface, and a subsequent rotation of this initial axis about a line perpendicular to the mating surface.

Cylinder heads are initially manufactured in complex, single-purpose, multi-spindle machines arranged to produce cylinder heads of a single design. In such machines the angles of the axes of the holes for valve stems and valve seats are all predetermined, and the expense of automatic means for receiving the rough cylinder heads and positioning and indexing them for successive machine operations is economically feasible.

If the reconditioned cylinder head is to operate properly, the axes of the guides and seats after replacement must coincide with the axes of the original guides and seats. Heretofore, it has been a difficult and time-consuming task to position a cylinder head to be reconditioned in a drilling machine so that the holes when machined will, in fact, have the axes desired.

To be economically feasible, a machine for doing such cylinder head reconditioning must be capable of receiving heads of any design by any maker, and the use of multiple tool spindles and automatic work positioning and indexing is not only prohibitively expensive initially, but it would entail so much set-up time, when a head of a different design from that last worked on must next be reconditioned, as to be wholly impractical.

It is a principal object of the present invention to provide improved apparatus for positioning a work piece with respect to a tool axis.

Another object is to provide such apparatus in which the work piece may be rotated about a pair of mutually orthogonal axes, one of which remains orthogonal to the tool axis, and may also be translated in a plane normal to said axis.

It is a further object of the invention to provide new and improved means for facilitating the reconditioning of valve-in-head cylinder heads by installation of replacement guides and by refurbishment of seats.

Another object of the invention is to provide an improved method of mounting and positioning a cylinder head for reconditioning.

Another object of the invention is to provide new and improved cylinder head mounting means for use with a fixed bed drilling machine for reconditioning cylinder heads by installation of replacement valve guides.

Various other objects, advantages, and features of novelty which characterize my invention are pointed out with particularity in the claims annexed hereto and forming a part hereof. However, for a better understanding of the invention, its advantages, and objects obtained by its use, reference should be had to the subjoined drawings, which form a further part hereof, and to the accompanying descriptive matter, in which there is illustrated and described a preferred embodiment of the invention.

Figure 1:
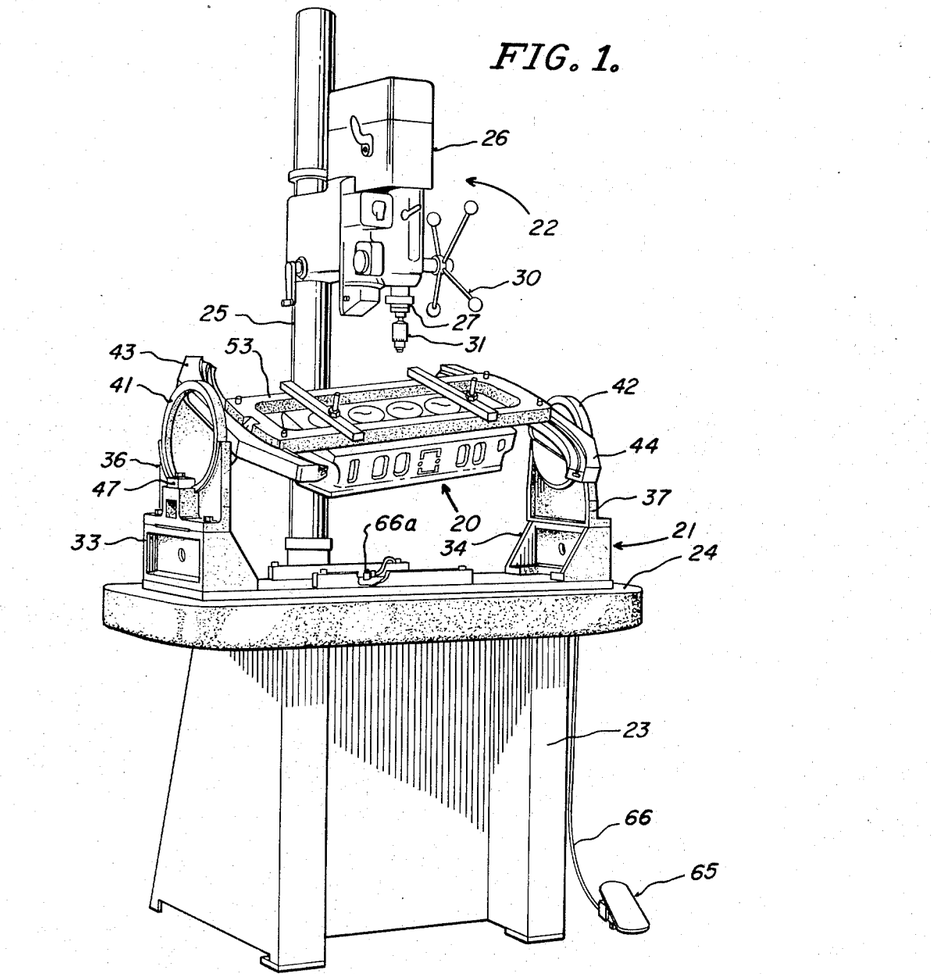
FIG. 1 shows mounting means according to the invention installed in a drilling machine and carrying a cylinder head to be reconditioned.

Turning now to FIG. 1, a cylinder head 20 is shown mounted in a cradle 21 for reconditioning in a drilling machine 22. While any drilling machine of sufficient capacity may be used, it is desirable to use a machine having a sturdy base, so that driving operations incidental to the installation of replacement guides and seats may be accomplished without affecting the accuracy of the machine. In the figure, a fixed base 23 has a flat horizontal bed 24 to the center of which at the rear is secured a column 25 upon which a housing 26 is mounted for axial and rotational adjustment. Suitable motor and gear change means are contained in housing 26 to drive a spindle 27 at any desired speed, and a hand wheel 30 enables the operator to feed spindle 27 axially toward bed 24. A suitable chuck 31 is carried on the end of spindle 27 to receive the shanks of various tools and bits to be driven.

Figure 2:
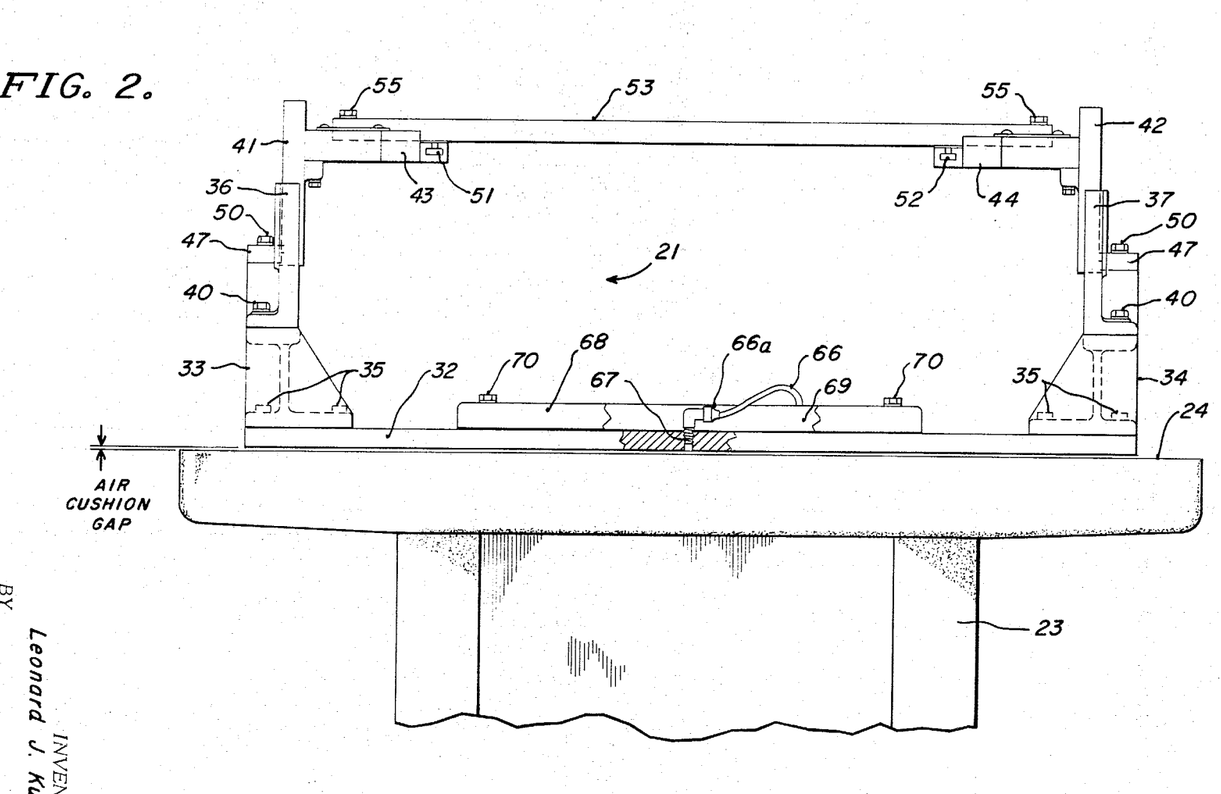
FIGS. 2, 3 and 4 are fragmentary front, end, and plan views of the apparatus as used.
Figure 3:
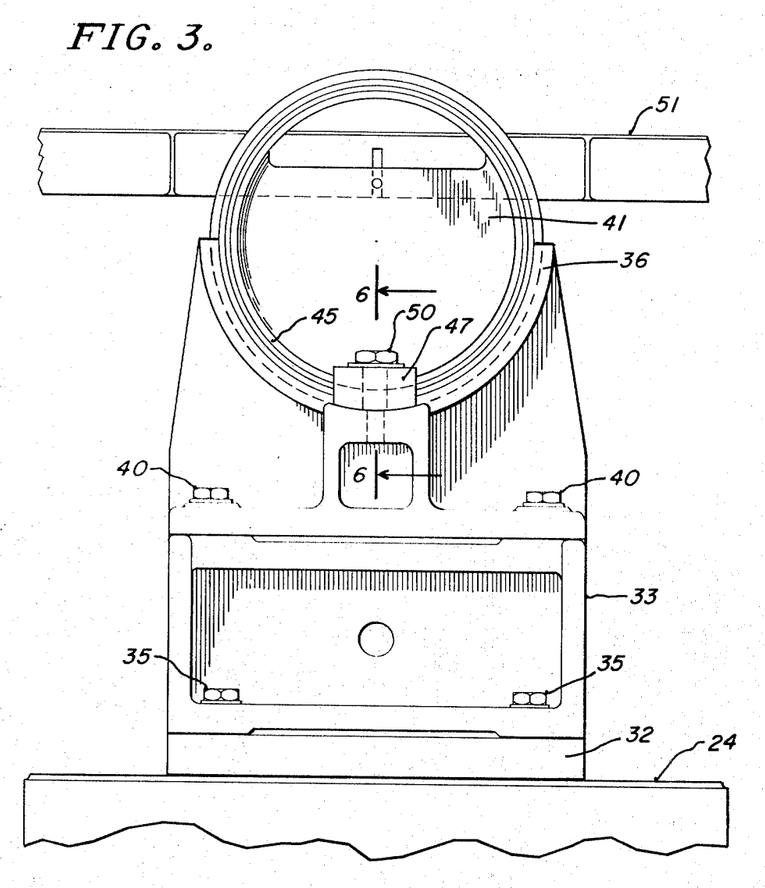
Figure 6:
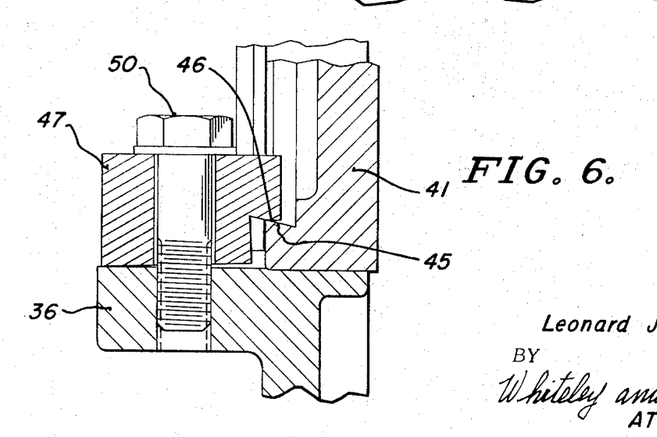
FIG. 6 is a fragmentary sectional view taken along the line 6—6 of FIG. 3.

Cradle 21 is shown better in FIGS. 2–6. It comprises a flat base plate 32 which is adapted to rest on machine bed 24, and which has raising blocks 33 and 34 secured at its ends by suitable means 35. A pair of trunion bearings 36 and 37 are mounted on blocks 33 and 34 respectively by suitable means 40, and are machined to receive a pair of circular trunions 41, 42, carrying arcuate arms 43, 44, respectively. As shown in FIGS. 3 and 6, trunion 41 has a dovetail rim 45 engaged by the lip 46 of a clamp 47 held to trunion bearing 36 by suitable means 50: the same structure is provided for trunion 42.

When mutually oriented in a suitable manner, arms 43 and 44 define a common plane, and they are provided with T-slots 51, 52, which are arcuate about a common center lying between them. A head-mounting frame 53 with a large central aperture 54 has its ends arcuate about the common center, and is secured to arms 43 and 44 by means 55, including T-bolts movable in slots 51, which may be tightened to secure frame 53 rigidly to arms 43 and 44, so that all three may rotate as a unit about the axis of trunions 41 and 42.

Figures 4, 5:
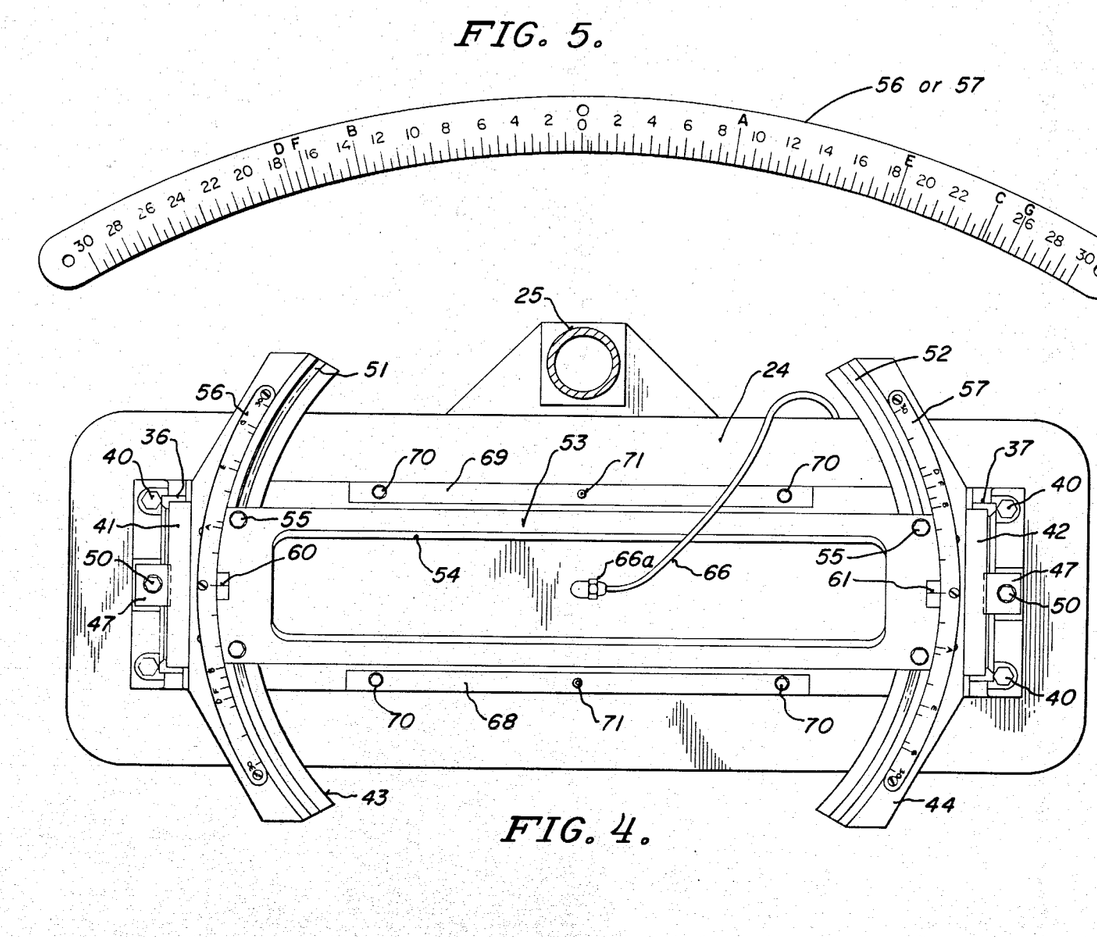
FIG. 5 is a detail of FIG. 4.

Arms 43 and 44 are provided with arcuate scales 56 and 57 graduated in degrees of rotation about the common center, as is better shown in FIG. 5, and also carry arbitrary graduations, identified by the capital letters A to G, which will be described below. A pair of index lines 60 and 61 are carried at the ends of member 53, and lie on a diameter passing through the common center. This arrangement provides for angular adjustment of frame 53 in its own plane about a work axis passing through the common center. This axis is orthogonal with a second work axis maintained by trunions 41 and 42, about which frame 53 may also be angularly adjusted: the latter axis is at all times parallel to bed 24 and hence orthogonal to the tool axes of spindle 27.

Figure 7:
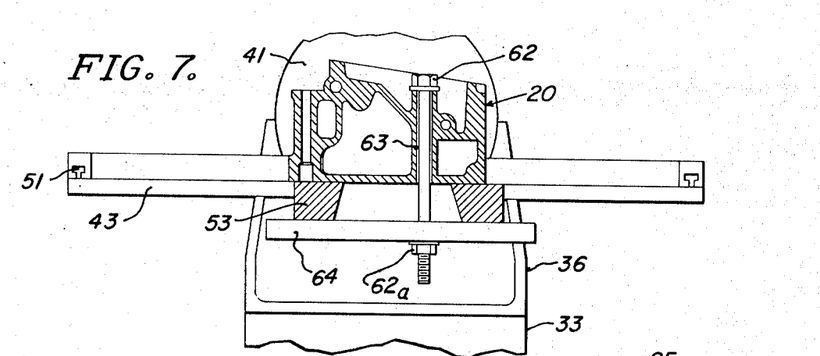
FIG. 7 shows how a cylinder head is initially mounted according to the invention, parts being in section.

The method of mounting the cylinder head to be conditioned is shown in FIG. 7, where frame 53 is shown in an inverted position parallel to the bed of the machine. Suitable bolts 62 pass through the holes 63 normally provided in the head for the passage of mounting studs, and then through clamp bars 64. By securely tightening nuts 62a, the head is rigidly mounted in a position which can be angularly adjusted about the two work axes previously described.

It is desirable that the work piece be translatable on the machine bed, in order that all the valve guides and seats may be reconditioned without removing the head from the frame. To accomplish this, compressed air from a suitable source, not shown, is admitted by a treadle valve 65 (FIG. 1), a hose 66, and a coupling 66a to a hole 67 passing through base plate 32, to provide an air bearing between the plate and machine bed 24. As long as the air bearing is maintained, the entire assembly comprising plate 32 and everything carried on it is free for translation on the machine bed: when the air supply is cut off the plate settles down on the bed without any tendency to shift, if the bed is level, and remains in position due to its own weight during the machining process.

In order for an air bearing of this type to operate satisfactorily, it is necessary that the upper surface of the bed and the lower surface of the plate be accurately plane. This would ordinarily require that plate 32 be of comparable stiffness with bed 24, and that the plate be ground to a high degree of flatness. One feature of this invention lies in an expedient for dispensing with this requirement so that a one inch steel plate may be used. For this purpose, a pair of adjusting bars 68 and 69 — FIG. 4 — are secured at their ends to plate 32 by bolts 70. Each bar has a set screw 71 at its center bearing against plate 32. Only slight tightening of one or the other of set screws 71 is sufficient to correct any distortion in the plate, so that proper air bearing operation is possible. This operation continues even if the plate is displaced laterally to extend somewhat beyond the edge of bed 24: up to 10 inches of overhang can be tolerated.

Figures 8, 10:
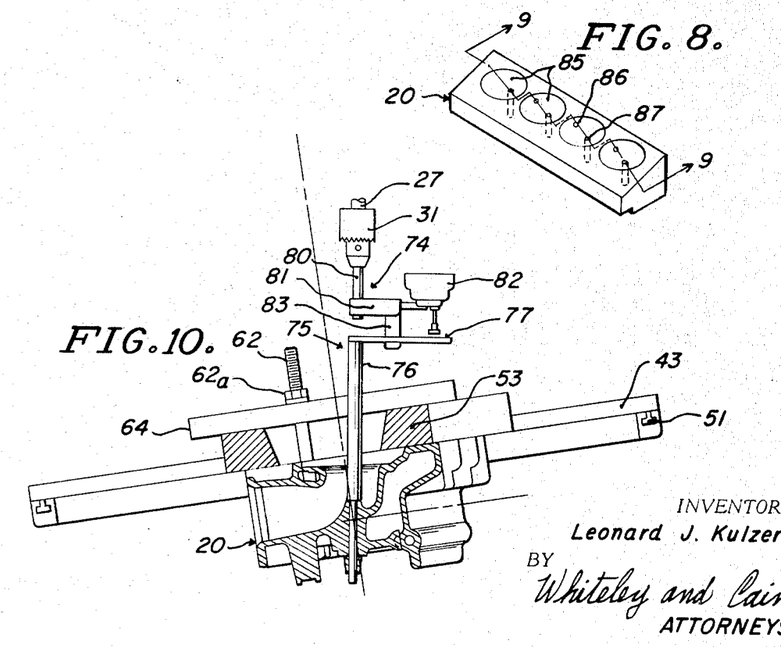
FIG. 8 is a highly diagrammatic showing of a cylinder head having its valves in the compound angle arrangement.
FIG. 10 shows one step in the method of reconditioning cylinder heads according to the invention where extreme precision is desired.

In FIG. 8 there is shown a schematically a cylinder head having a compound angle valve arrangement. The location of the actual heads for the individual cylinders are shown at 85, each being provided with an intake valve seat 86 and an exhaust valve seat 87.

Figure 9:
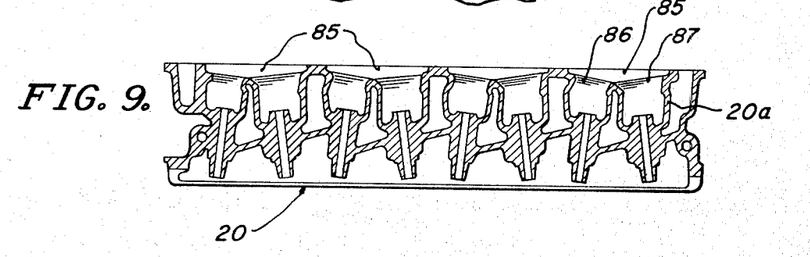
FIG. 9 is a generally longitudinal sectional view of the cylinder head of FIG. 8, the section being taken along the line 9—9 of FIG. 8.

FIG. 9 is a more pictorial view of the head taken in section along the line 9—9 of FIG. 8. The plane mating surface referred to above is identified at 20a, and the individual cylinder heads 85, intake valve seat 86, and exhaust valve seat 87, are clearly identified.

In use, the machine is installed and provided with power, and its bed carefully leveled. Cradle 21 is now hoisted onto the bed of the machine, the air source is energized, and treadle valve 65 is operated to admit air to fitting 66a, whereupon the cradle floats on its air bearing and is enabled to move over the bed: screws 71 are adjusted as necessary to perfect the air bearing. The cradle is adjusted with its trunion axis parallel to that of the bed, and lowered to engage it. Frame 53 is initially centered on arms 43 and 44, and is parallel with plate 32, as shown in FIG. 2.

Clamps 47 are now loosened and frame 53 is rotated about the trunion axes through 180°, so that the lower surface, as shown in FIG. 2, is upward (see FIG. 7). A cylinder head to be reconditioned is laid with its plane gasket surface on frame 53, bolts 62 are passed through stud holes 63 in the block and through holes in clamp bars 64, and nuts 62a are loosely installed. The head is positioned so that the valve ports are approximately centered in the frame. The longitudinal axis of the head must be made substantially parallel with the work axis of the trunions: this can be conveniently done by aligning the manifold gasket surface of the head with the edge of the frame within one thirty-second inch. Nuts 62a are now securely tightened and frame and head are again rotated to 180° to the position shown in FIG. 2, or to such other angle as the configuration of the head being reconditioned requires. If a compound angle valve arrangement is used, frame 53 is then rotated in T-slots 51 and 52 to the appropriate angle: for convenience the common angles required are identified by the capital letters on scale 56, a tabulation of the angles appropriate to a variety of heads to be reconditioned being supplied with the machine. For single angle valve arrangements, the angle is of course zero.

Except where the most accurate work is desired, the method of positioning the head in the cradle is as follows. A simple rod or alignment member is mounted in chuck 31. Its diameter is such as to adapt it for insertion into the valve guides in the head without substantial play transverse thereto. The cradle is raised onto its air bearing by use of treadle valve 65. Then by rotating the head about the trunion axis and simultaneously translating plate 32 on bed 24, a position of the head can be achieved in which the alignment member enters and rotates freely in the valve guide without binding. The cradle is then lowered onto the machine bed and locked about its trunion axis, suitable drilling, reaming or other tools may be placed in the chuck in sequence, instead of the alignment member, and the machining process may be carried on.

FIG. 10 is a transverse cross section of a cylinder head mounted by bars 64 on frame 53, showing a more precise refinement of the positioning process. A special tool 74 is mounted in the chuck 31 of the machine, and a second special tool 75 is mounted for rotation without play in the first inlet valve guide. Tool 75 includes a shaft 76 with an arm 77 perpendicular thereto. Tool 74 includes a shaft 80 with an arm 81 perpendicular thereto: arm 81 carries a dial indicator 82 and a further stop 83, and the contact of the indicator is brought to engage the top of arm 77.

When chuck 31 is set in rotation, stop 83 engages the edge of arm 77 and causes tool 75 to rotate in the valve guide. The cradle has been initially set so that the axis of the valve guide is approximately in line with that of the chuck: as the spindle rotates, the needle of the dial indicator oscillates back and forth. The cradle is rotated on its trunion axis, and allowed to move on its air bearing, until the dial indicator needle remains motionless, when the desired alignment has been achieved. The air is released so that the cradle settles down on the bed, and clamp 47 is secured with a lock. Reconditioning of the valve guide and seat may now be accomplished, after which the treadle valve is operated to provide an air bearing for sliding the head to the next inlet valve guide axis under the spindle: no angular adjustment of the trunion is necessary until all the inlet valves are completed and a new angle must be set for the outlet valve axes, if this is necessary.

Central to the present invention is the appreciation that if the head is set to the proper angle in arms 43 and 44, which may be zero, there is one and only one combination, of translation of the cradle on the bed and rotation of the trunions about their axis, in which the axis of a particular valve is parallel with the tool axis. This combination can be achieved manually by a relatively unskilled machine operator, and when achieved applies to all the valves of a head having a single angle arrangement, and to all the intake or all the exhaust valves of a head having a compound angle valve arrangement. It is also important to note that inadvertent rotation of the cradle on the machine bed when translation from one valve position to the next is being accomplished, is without effect on the correctness of the cradle angles once alignment has been initially achieved.

Numerous objects and advantages of my invention have been set forth in the foregoing description, together with details of the structure and function of the invention, and the novel features thereof are pointed out in the appended claims. The disclosure, however, is illustrative only, and changes may be made in detail, especially in matter of shape, size and arrangement of parts, within the principle of the invention, to the full extent indicated by the broad general meaning of the terms in which the appended claims are expressed.

I claim as my invention:

1. A method of aligning the axis of a tool with the axis of a hole in a work piece having a known angle other than 90° with a known plane surface of said work piece, which comprises steps of:
   a. mounting the work piece in a holder for rotation about a first work axis parallel to said plane surface and for rotation about a second work axis perpendicular to said first work axis, with said plane surface substantially perpendicular to said second work axis;
   b. rotating said work piece to a predetermined angular position about said second work axis;
   c. mounting along said tool axis a guide member adapted in size for insertion in said hole without substantial play transverse of the axis of said hole;
   d. simultaneously translating said holder parallel to said first work axis and rotating said holder about the first work axis until said guide member enters and passes freely in said hole without binding; and
   e. locking said holder against further rotation.

2. The method of resizing a valve guide in a cylinder head which comprises the steps of:
   a. mounting the cylinder head in a cradle which is rotatable about a first normally horizontal work axis and about a second work axis orthogonal thereto;
   b. positioning the cradle mounted cylinder head for translation or sliding motion on the horizontal bed of a machine having a vertical-tool-rotation working axis;
   c. mounting for rotation about and translation along said tool axis an alignment tool adapted to be received in said valve guide without substantial play;
   d. setting the cylinder head to a predetermined rotational position about the second work axis of the cradle;
   e. rotating said head about the first work axis of the cradle; and
   f. translating the cradle on said bed of the machine until said alignment tool enters and rotates freely in said valve guide; and
   g. locking said cradle against further rotation about said first work axis; and h. substituting a working tool for the alignment tool in said machine.

3. A method of aligning the axis of a cylindrical opening in a work piece with the axis of a rotary tool wherein the axis of said opening in the work piece is other than 90° with respect to a known plane surface of said work piece for the purpose of modifying the opening in said work piece, comprising:

a. supporting said work piece at right angles to the axis of the rotary tool for rotation relative to such axis about a first axis parallel with said known plane surface of said work piece, and also for rotation relative to such tool axis about a second axis at right angles to said known surface of said work piece;

b. aligning the axis of said rotary tool with the axis of the opening in said work piece by rotating said work piece relative to said tool axis through an angle about the first axis of rotation of support of said work piece;

c. rotating said work piece relative to said tool axis through a known angle about the second axis of rotation of the support of said work piece;

d. mounting along said tool axis an alignment member adapted for insertion into the opening in said work piece without substantial play transverse of the axis of the opening in said work piece;

e. providing relative movement between said work piece and said tool axis parallel to said first axis of rotation thereof until said alignment member can enter and freely rotate in the opening in said work piece;

4. A method of aligning the axis of a linearly operable tool with a selected direction line of a work piece, said direction line of the work piece having an angle other than 90° with a known plane surface of said work piece, the selected direction line being taken with respect to both an axis parallel to and orthogonal to the known plane surface of the work piece, and following alignment of said tool axis and said direction line causing modification of the work piece by said operable tool, comprising the steps of:

a. supporting the work piece with a known plane surface thereof parallel both to a supporting flat bed and to a first axis of rotation of the work piece;

b. supporting said tool so that the axis thereof is orthogonal to the flat bed;

c. rotating the work piece through an angle about a second axis of rotation of the work piece orthogonal to the known plane surface thereof;

d. rotating the work piece through an angle about the first axis of rotation of the work piece parallel to the known plane surface of the work piece, to cause the tool axis and selected direction line to be parallel;

e. mounting an alignment tool along the tool axis to become coincident with the selected line;

f. translating the work piece parallel to the flat bed, to cause the selected direction line and tool axis to be coincident; and g. substituting a working tool for the alignment tool for modification of the work piece in the selected direction.

5. A method of aligning the axis of a tool with the axis of a hole in a work piece, the hole in the work piece having a known angle other than 90° in relation to a known plane surface of the work piece, comprising the steps of:

a. supporting said work piece for rotation about a first work axis parallel to said known plane surface, and for rotation about a second work axis perpendicular to said first work axis, with said known plane surface substantially perpendicular to said second work axis;

b. rotating said work piece to a predetermined angular position about said first work axis;

c. rotating said work piece about said second work axis;

d. mounting an alignment member along one of the first two recited axes, namely, the axis of the tool and the axis of the hole;

e. and providing relative translational movement of said work piece with respect to said tool axis to allow the alignment member mounted in said one of the first two recited axes to become coaxial with the other of said axes.

6. In a method of sizing valve guides in a cylinder head of an internal combustion engine, comprising the steps of:

a. supporting said cylinder head with its gasket engaging surface in a horizontal plane for rotation about a first horizontal work axis, and also rotation about a second work axis located in a plane perpendicular to said first work axis, said last named plane forming a right angle with the horizontal plane through said first work axis;

b. supporting a rotatable tool so that its axis is perpendicular to said first horizontal work axis;

c. inserting a guide member into one of said valve guides of the cylinder head, said guide member being without substantial transverse play therein;

d. adjusting the position of said cylinder head relative to the axis of said tool by rotating said head about both of said work axes until there exists a substantial parallelism between the axis of said tool and the axis of said guide member in said cylinder head;

e. and relatively translating said cylinder head with respect to said tool axis in a plane substantially at right angles to said tool axis to align the axis of said guide member in said cylinder head with the axis of said tool.

* * * * *

UNITED STATES PATENT OFFICE
CERTIFICATE OF CORRECTION

Patent No. 3,782,347                     Dated January 1, 1974

Inventor(s) Leonard J. Kulzer

It is certified that error appears in the above-identified patent and that said Letters Patent are hereby corrected as shown below:

On the title page, in the title cancel "And Apparatus"

Cancel the Abstract and substitute the following
-- A method for performing mechanical operations on a work piece, such as a cylinder head having valve guides and valve seats that need reconditioning, including steps of supporting a cylinder head for rotation about two mutually perpendicular axes to bring a point on the work piece, as an opening such as a valve stem guide for example to be reconditioned, into proper directional alignment with a line of movement of a reconditioning tool, effecting linear translation of the cylinder head with respect to said line of movement for alignment of the opening therein and said line of movement, and relatively linearly moving the cylinder head and the reconditioning tool into engagement for said reconditioning action. --

Column 1, cancel "And Apparatus" in the title.

Column 1, line 7, cancel the comma and substitute a period.

Column 1, line 7, cancel "and an appara-"

Column 1, line 8, cancel "tus for practicing the method."

Column 2, line 32, cancel "apparatus" and substitute -- method --.

Column 2, cancel lines 34-42.

Column 2, cancel lines 45-49.

UNITED STATES PATENT OFFICE
CERTIFICATE OF CORRECTION

Patent No. 3,782,847                    Dated January 1, 1974

Inventor(s) Leonard J. Kulzer

It is certified that error appears in the above-identified patent and that said Letters Patent are hereby corrected as shown below:

Claim 5, column 8, line 16 cancel the comma and substitute a semi-colon.

Claim 5, column 8, line 16, cancel "with said known".

Claim 5, column 8, cancel lines 17 and 18.

Signed and sealed this 23rd day of April 1974.

(SEAL)
Attest:

EDWARD M.FLETCHER,JR.                    C. MARSHALL DANN
Attesting Officer                        Commissioner of Patents